W. EDWARDS.
SHAFT COUPLING.
APPLICATION FILED JULY 19, 1920.

1,434,690.

Patented Nov. 7, 1922.

Inventor:
William Edwards,
by Albert G. Davis
His Attorney.

Patented Nov. 7, 1922.

1,434,690

UNITED STATES PATENT OFFICE.

WILLIAM EDWARDS, OF SCHENECTADY, NEW YORK, ASSIGNOR TO GENERAL ELECTRIC COMPANY, A CORPORATION OF NEW YORK.

SHAFT COUPLING.

Application filed July 19, 1920. Serial No. 397,257.

*To all whom it may concern:*

Be it known that I, WILLIAM EDWARDS, a citizen of the United States, residing at Schenectady, in the county of Schenectady, State of New York, have invented certain new and useful Improvements in Shaft Couplings, of which the following is a specification.

The present invention relates to shaft couplings for transmitting power between a driving and a driven shaft, and particularly shaft couplings of the pin type which are arranged to permit of a limited amount of axial adjustment between the driving and driven members.

As is well known in connection with pin couplings, it is very necessary that the openings in the flanges through which the pins pass be very accurately bored and aligned relatively to each other so that each pin will take its correct share of the load, and while by indexing and boring the two coupling flanges together, accuracy can be obtained in the first instance, when occasion requires the substitution of a new coupling flange, great difficulty may be encountered in getting exact alignment particularly if ample facilities are not obtainable for doing the work.

The object of my invention is to provide an improved structure and arrangement in a coupling of this type which is particularly well adapted to permit of repairs being made to it, and for a consideration of what I believe to be novel and my invention, attention is directed to the accompanying description and the claims appended thereto.

Figure 1:
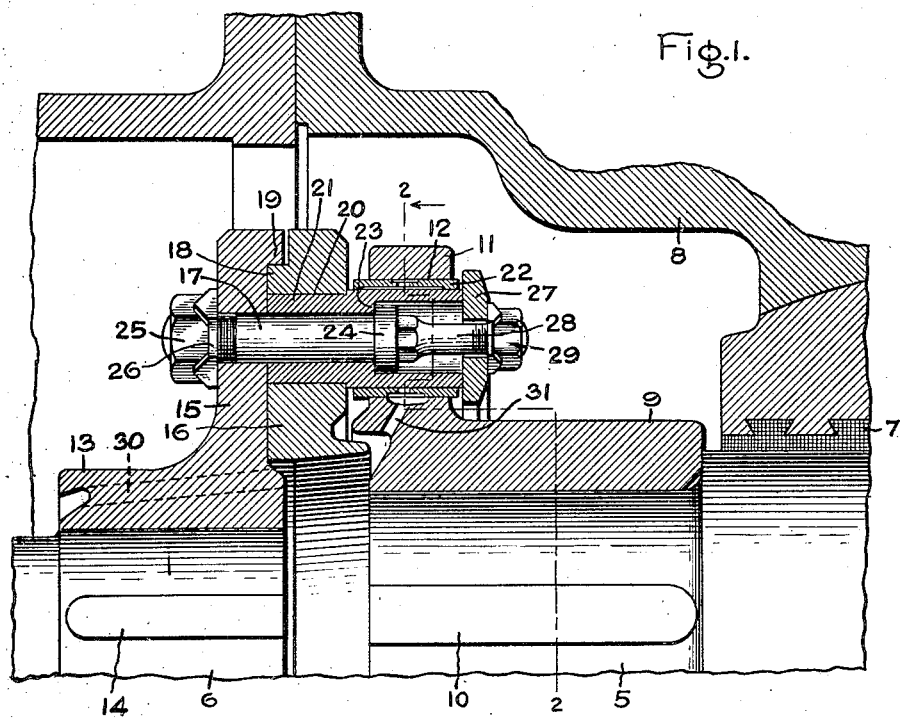
Figure 2:
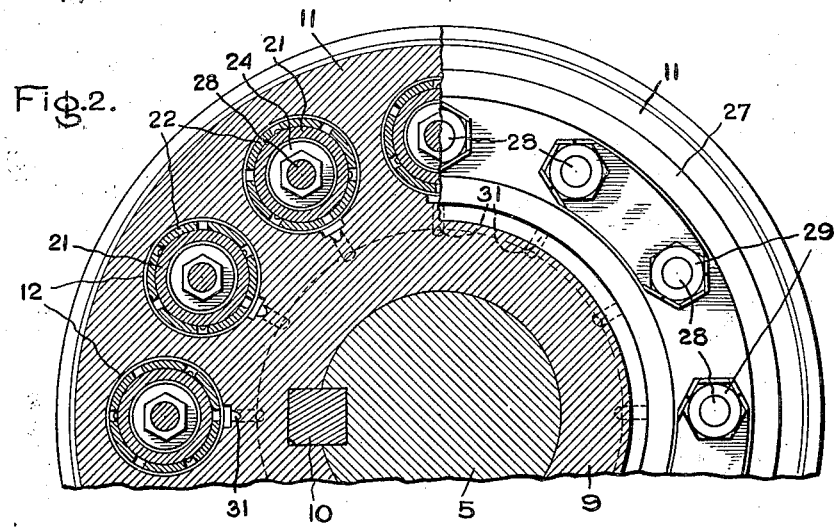

In the drawing, Fig. 1 is an axial, sectional view of a coupling embodying my invention, and Fig. 2 is a section taken on line 2—2, Fig. 1. In each of the figures the lower portion of the coupling is omitted being exactly the same as that shown.

Referring to the drawing, 5 and 6 indicate adjacent shaft ends which are to be coupled together. The shaft 5 may be a driving shaft, for example the shaft of an elastic fluid turbine, and the shaft 6 a driven shaft, for example the shaft of the high speed pinion of a reduction gearing, or the shaft of other driven apparatus. A bearing for shaft 5 is indicated at 7 and a housing for the coupling at 8.

The end of shaft 5 is reduced somewhat in diameter and on such reduced end is mounted a sleeve 9 fastened in position by a key 10 and provided with a coupling flange 11. In coupling flange 11 are a series of circumferentially spaced holes 12.

On shaft end 6 is mounted a sleeve 13 fastened by a key 14 and provided with a flange comprising two parts, a part 15 which is formed integral with sleeve 13 and a part 16 which is in the form of a ring and is bolted to flange part 15 by bolts 17. Flange part 15 may be termed a bolting flange and flange part 16 a retaining ring. For centering retaining ring 16 relatively to bolting flange 15, the ring may be provided with an annular shoulder 18 which takes under a ledge 19 on flange 15. In retaining ring 16 are holes 20 accurately spaced and centered with respect to holes 12. Fixed in each hole 20 is one end of an axially extending pin 21, the other ends of the pins being located in holes 12 and making a sliding fit therewith. Between each pin 21 and the surface of hole 12 is a floating bushing 22, the purpose of which is to compound the bearing thereby providing double sliding surfaces and thus reducing to a minimum the likelihood of the coupling binding.

In the present instance pins 21 are shown as being hollow and counterbored at one end to form an internal shoulder 23, and bolts 17 extend through pins 21, their heads 24 resting against shoulders 23. On the ends of bolts 17 are nuts 25 held from working loose by locking means 26 which may be in the form of plates provided with upturned ears which engage the flat sides of the nuts.

A ring 27 is provided for keeping floating bushings 22 in place there being a suitable clearance as shown to permit of limited axial movements of the bushings. Ring 27 is held against the ends of pins 21 by studs 28 which may be formed integral with bolts 17, and which receive nuts 29 on their ends. At 30 and 31 are oil passages for conveying lubricant to the coupling.

It will be noted that retaining ring 16 carries pins 21 and that when the coupling is assembled its outer face is spaced sufficiently far from flange 11 so that by removing bolts 17, ring 16 may be moved axially to bring shoulder 18 from under ledge 19 thus entirely disconnecting the shafts and permitting the apparatus to which either is connected to be lifted vertically. When thus dismantled, since retaining ring 16 carries the one end of the pins and the flange 11 the other, the alignment of the coupling is not disturbed and, if a new flange part 15 is substituted, retaining ring 16 can be bolted directly to it and the coupling will be aligned as before, since the relation of the pins has not been disturbed. This is of great importance where for example shaft 6 is the pinion shaft of a gearing and it becomes necessary to renew the pinion. Under these circumstances a new pinion can be substituted and its flange 19 bolted to ring 16 without difficulty since the openings in flange 19 through which bolts 17 pass are not used to line up the pins with the openings in flange 11 and hence are not required to be accurately centered therewith.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. In a coupling for adjacent shaft ends, a flange on one shaft end having circumferentially spaced openings therein, a flange on the other shaft end, a ring located between said flanges, detachable means fastening the ring to the second named flange, and spaced pins fixed to and carried by said ring and projecting into the openings in the first-named flange, whereby said second-named flange may be removed without disturbing the pin connection between the ring and first-named flange.

2. In a coupling for adjacent shaft ends, a flange on one shaft end having circumferentially spaced openings therein, a flange on the other shaft end, a ring fastened to the second named flange, said last named flange and ring having engaging shoulders, and pins fixed to said ring and projecting into the openings in the first named flange, there being sufficient clearance between the ring and first named flange to permit the ring to move axially to disengage said shoulders.

3. In a coupling for adjacent shaft ends, the combination with flanges on such ends, of a ring having pins fixed thereto and projecting from one side thereof, and separate means fastening the ring to one of said flanges, the other flange having openings therein with which the projecting ends of the pins have sliding engagement, whereby said ring may be detached from the flange to which it is connected without disturbing said pins.

4. A pin coupling comprising flanges and pins fixed to one flange and slidingly engaging openings in the other flange, characterized by the fact that the pins instead of being fixed directly to the one flange are fixed to an annular ring which in turn is bolted to such flange, by means independent of the means which fixes the pins to the ring, whereby the ring may be detached from such flange without disturbing the pins.

In witness whereof, I have hereunto set my hand this 16th day of July, 1920.

WILLIAM EDWARDS.